June 22, 1965 J. T. McNANEY 3,191,049

LIGHT RESPONSIVE DECIMAL TO BINARY DATA CONVERTER SWITCH MEANS

Filed March 19, 1962

INVENTOR.

Joseph T. McNaney

3,191,049
LIGHT RESPONSIVE DECIMAL TO BINARY DATA CONVERTER SWITCH MEANS

Joseph T. McNaney, 8548 Boulder Drive, La Mesa, Calif.

Filed Mar. 19, 1962, Ser. No. 180,603
7 Claims. (Cl. 250—227)

This invention relates to data converter switch means which is designed for use in conjunction with data converter means of the type wherein binary coded voltage levels are derived from decimalized light radiation input functions.

This invention, therefore, represents a switch means which utilizes a decimally positioned light source as the input signal for effecting circuit connections between a source of voltage and a set of binary code related circuit terminals in a manner corresponding to the decimally related position of the light source.

A decimally positioned source of light may, for example, be generated by a cathode ray tube, a mirror galvanometer, an illuminated chart of graphically recorded information, etc. There are numerous means of generating a decimally positioned light beam from which a binary coded signal must be derived. It is, therefore, an object of this invention to provide the switch means necessary for converting such information into corresponding binary code related circuit connections.

It is a further object of this invention to provide an improved decimal to binary data converter switch means which is responsive to light input information which is simple in construction, positive in operation, and trouble-free in continued use.

It is still another object of this invention to utilize the light conducting efficiency of optical fiber light conducting means to control the illumination of binary code related photoconductive switch elements corresponding to light information being received from a decimalized light source.

Other objects and advantages will appear hereinafter as a description of the invention proceeds.

The novel features that are considered characteristic of this invention are set forth with particularity in the appended claims. The invention itself, both as to its organization, and method of operation, as well as additional objects and advantages, will best be understood from the following description when read in connection with the accompanying drawings in which:

Figures 1, 2, 3:
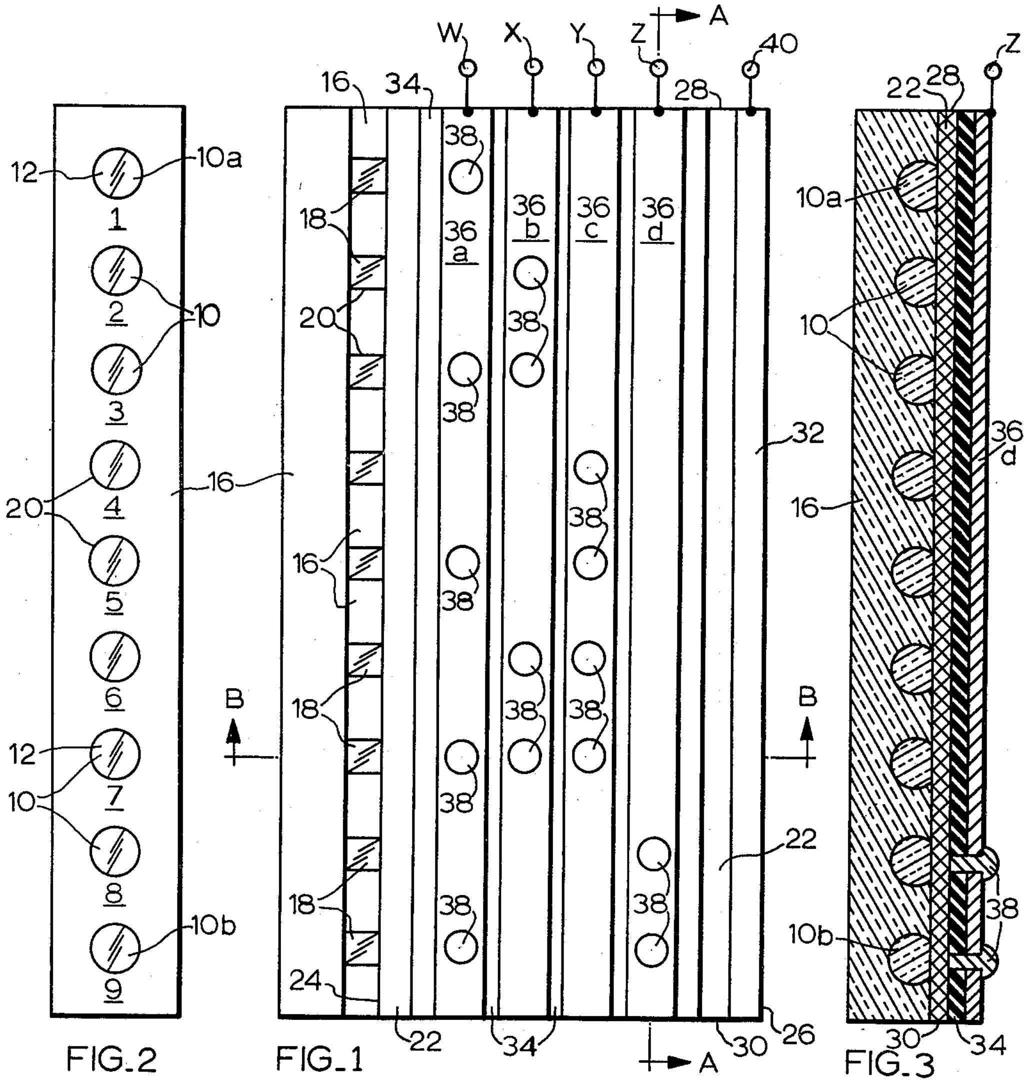
FIGURE 1 is a plan view of an embodiment of the invention.
FIGURE 2 is an end view of FIGURE 1, showing light input ends of the optical fiber light conducting means.
FIGURE 3 is a sectional view of FIGURE 1 through A—A.
Figure 4:
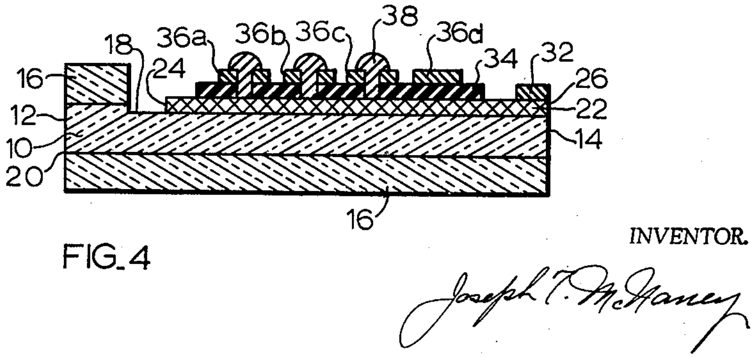
FIGURE 4 is a sectional view of FIGURE 1 through B—B.

Referring now to FIGURE 1, which is a plan view of the decimal to binary data converter switch means of this invention, and with reference to the end view and sectional views, respectively, of FIGURES 2, 3 and 4, the invention is shown to include a plurality of paralleled light guides 10, or, optical fiber light conducting means 10, arrayed, for example, in a straight line side-by-side relationship. The optical fibers 10 will, thereby, be permitted to receive light upon entering a first transverse end 12, whereupon the light is conducted to a second transverse end 14 thereof. Each of the fibers 10 have a longitudinal dimension which exceeds its cross sectional dimension, a predetermined index of refraction, and a smooth outer surface generally along its longitudinal dimension. The fibers 10, which are composed of glass, lucite, or similar light conducting materials, can be drawn down to cross sectional dimensions of less than 0.001", and in order for fibers such as these to be efficient light conductors they must be clad in a light conducting material having an index of refraction less than the predetermined index of the fiber itself. The fibers 10, therefore, are intimately joined with a light conducting material 16 which has an index of refraction less than the predetermined index of the fibers 10. The lower index light conducting material 16 of this invention, which also functions as the support means for the fibers 10, is intimately joined to a predetermined portion of the outer surface of each of the fibers 10, so as to leave an uncoated portion 18 along the longitudinal dimension thereof, while forming a smooth interface at and along the juncture 20.

A layer of photoconductive material 22 is disposed upon and intimately joined to at least a portion of the uncoated portion 18 of each fiber 10. The layer 22 is shown to have a first end 24 and a second end 26, and a first edge 28 and a second edge 30. The first edge 28 is shown to extend from at least the uncoated surface 18 of a first fiber *10a* of the plurality of fibers 10 to at least the uncoated surface 18 of a last fiber *10b* thereof. Along the second end 26 of the layer 22 there is an electrode 32 which is operatively connected thereto, and which extends from the first edge 28 of the layer 22 adjacent the first fiber *10a* to the second edge 30 of the layer 22 adjacent the last fiber *10b*.

A layer of electrical insulating material 34 is disposed upon the layer 22 of photoconductive material, and a plurality of paralleled electrical conductors *36a*, *36b*, *36c* and *36d* are disposed upon the layer 34 of electrical insulating material, extending from the first fiber *10a* to the last fiber *10b* of the plurality of fibers 10. The electrical conductors 36 are angularly displaced with respect to the fibers 10 so as to define between them a plurality of fiber 10 and conductor 36 crossings. Coincident with predetermined crossings of fibers 10 and conductors 36, the conductors 36 are operatively connected to the layer 22 of photoconductive material by means of individual lead-through connector means 38. There, of course, will not be any electrical insulating material 34 at each of the predetermined fiber 10 and conductor 36 crossings to thereby permit the electrical conductors 36 to be in electrical contact with the layer 22 at these predetermined crossings. Although I have illustrated the use of lead-through connector means 38 as a means of connecting the conductors 36 to the layer 22, it should be understood that the electrical conductor material 36 itself may be made to contact the layer 22 directly through openings in the insulating material 34 and, thereby, avoid the requirement of the lead-through connector means 38.

The photoconductive material 22 may be chosen from such materials as selenium, cadmium sulphide, silver selenide, or like materials. In a dark state, the layer 22 presents itself as a resistor to the flow of electrical current. When properly illuminated, however, the layer 22 can be made to function as a conductor of electrical current. In the present invention predetermined areas of the layer 22 will be made to function as a conductor of electrical current upon the admission of light to predetermined optical fibers 10. For example, upon the admission of light to a given fiber 10, the photoconductive material 22 of that particular fiber will be illuminated and made conductive from the first end 24 to the second end 26 thereof. The layer 22 will be illuminated by virtue of the fact that the light upon entering the first transverse end 12 of the fiber 10 will be conducted to the opposite end 14 by reason of a series of internal reflections made possible by the lower index light conducting material 16 intimately joining the outer surface of the fiber 10, which has a relatively high index of refraction. Due to the spiralling and scattering of the reflected light waves during the course of their travels from the first transverse end 12 to the opposite end 14, the required percentage of the total amount of light being reflected through the fiber will be permitted to reach the layer 22 on the surface 18 of that particular fiber 10.

For the purpose of explaining the operating principles of the invention I have shown the switch means in the drawing as being comprised of nine optical fibers 10, and have identified these fibers decimally as fibers 1, 2, 3, 4, 5, 6, 7, 8 and 9. I have also shown the switch means as being comprised of four electrical conductors **36*a*, 36*b*, 36*c* and 36*d*** being connected, respectively, to output terminals W, X, Y and Z. The nine fibers will represent the light responsive decimal input elements to the switch and the four terminals W, X, Y and Z will represent the binary code related output terminals, which I have shown again in the Table 1, below, for a more complete explanation of the switch means of this invention.

*Conversion Table 1*

| Decimal Input | Binary Output | | | |
|---|---|---|---|---|
| | W | X | Y | Z |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

An examination of the Conversion Table 1, will show that there is a direct relationship between it and the switch means of the invention as illustrated in FIGURE 1. Each of the fiber 10-conductor 36 crossing connectors 38 in FIGURE 1, are represented by binary digits "1" in the Table 1. At each fiber 10-conductor 36 crossing where there is no electrical connection between them, such crossings are represented by the binary "0" in the Table 1.

A voltage supply terminal 40 is connected to the electrode 32 as a means of connecting a voltage to the switch means which will then be connected to the binary output terminals W, X, Y and Z, under the control of decimally positioned light admitted to the fibers 10. For example, light being admitted to the fiber 10 which has been decimally identified as fiber 7, allows the layer 22 of photoconductive material on the surface 18 of this particular fiber to be electrically conductive from the first end 24 to the second end 26. A voltage being connected to the electrode 32 terminal 40 will be connected, respectively, to the conductors **36*a*, 36*b* and 36*c* at the interconnection points 38 where these conductors cross the decimally identified fiber 7**. A voltage, therefore, will also appear on the binary output terminals W, X and Y, which may then be transformed, respectively, to binary voltage levels "1," "2," and "4."

In accordance with the Conversion Table 1, above, a voltage on the terminal 40 can be made to appear, selectively, on the binary output terminals W, X, Y and Z, under the control of decimalized light input functions. Although I have limited myself, in the illustration, to the showing of but nine decimal input fibers 10, and four binary output terminals, it should be understood by those skilled in the arts that my invention is not limited in this regard. It should likewise be understood that a plurality of fibers 10 may be arranged in rectangular matrix arrays, or in circular arrays, and still be under the control of decimalized light input functions.

It should, of course, be understood that many of the other embodiments embracing the general principles and constructions hereinbefore set forth, may be utilized and still be within the ambit of the present invention.

The particular embodiment of the invention illustrated and described herein is illustrative only, and the invention includes such other modifications and equivalents as may readily appear to those skilled in the arts, and within the scope of the appended claims.

I claim:

1. Light responsive decimal to binary data converter switch means comprising:
   - (a) a system of parallel binary code related electrical conductors;
   - (b) an electrode;
   - (c) photoconductor material interconnecting said system of conductors and said electrode;
   - (d) a system of parallel first light conductor means, having a predetermined index of refraction, for supporting said photoconductor material and conducting light to said photoconductor material;
   - (e) second light conductor means intimately joined to said first light conductor means, having an index of refraction less than said predetermined index, for controlling the reflection of light through said first light conductor means and reflection of light to said photoconductor material;
   - (f) said paralleled light conductor means being angularly displaced with respect to said parallel electrical conductors so as to define between them a plurality of rows and columns of light and electrical conductor crossings; and
   - (g) means for operatively connecting said electrical conductors to said electrode through said photoconductor material coincident with predetermined ones of said light and electrical conductor crossings—whereby independent sets of binary code related interconnections will be made between said electrical conductors and said electrode upon the reflection of light to said material coincident with predetermined rows of said crossings.

2. Light responsive decimal to binary data converter switch means comprising:
   - (a) a system of parallel binary code related electrical conductors;
   - (b) an electrode with means for connecting a voltage thereto;
   - (c) photoconductor material interconnecting said system of conductors and said electrode;
   - (d) a system of parallel first light conductor means, having a predetermined index of refraction, for supporting said photoconductor material;
   - (e) second light conductor means intimately joined to said first light conductor means, having an index of refraction less than said predetermined index, for controlling the conduction of light through said first light conductor means to said photoconductor material and, thereby, controlling the extension of said voltage to said system of electrical conductors;
   - (f) said paralleled light conductor means being angularly displaced with respect to said parallel electrical conductors so as to define between them a plurality of rows and columns of paralleled light and electrical conductor crossings; and
   - (g) means for operatively connecting said system of paralleled electrical conductors to said electrode through said material coincident with predetermined ones of said light and electrical conductor crossings.

3. Light responsive decimal to binary data converter switch means comprising:
   - (a) a system of paralleled binary code related electrical conductors;
   - (b) an electrode with means for connecting a voltage thereto;
   - (c) photoconductor material interconnecting said system of conductors and said electrode;
   - (d) a system of paralleled first light conductor means, having a predetermined index of refraction, for supporting said photoconductor material and conducting light to said photoconductor material in response to a decimally positioned light source;

(e) second light conductor means intimately joined to said first light conductor means, having an index of refraction less than said predetermined index, for controlling the reflection of light through said first light conductor means and reflection of light to said photoconductor material;

(f) means for deriving binary code related voltages from said system of electrical conductors corresponding to the decimal position of said light source;

(g) said paralleled light conductor means being angularly displaced with respect to said paralleled electrical conductors so as to define between them a plurality of rows and columns of light conductor and electrical conductor intersections; and (h) means for interconnecting said system of electrical conductors and said electrode coincident with said intersections so as to provide a predetermined matrix of binary code related light conductor and electrical conductor intersections.

4. Light responsive decimal to binary data converter switch means comprising:

(a) a system of paralleled binary code related electrical conductors;

(b) an electrode with means for connecting a voltage thereto;

(c) photoconductor material interconnecting said system of conductors and said electrode;

(d) said photoconductor material being adapted to extend the influence of said voltage to said system of electrical conductors, selectively, in response to light exposed thereto;

(e) a system of paralleled decimally oriented light conductors adapted to control the exposure of said photoconductor material to a decimally positioned light source;

(f) means for deriving binary code related voltages from said system of electrical conductors corresponding to the decimal position of said light source;

(g) said paralleled light conductors and said paralleled electrical conductors being supported respectively on adjacent planes and angularly displaced with respect to one another so as to define between them a plurality of rows and columns of light conductor and electrical conductor crossings;

(h) means for operatively connecting said system of electrical conductors to said electrode, through said photoconductor material, coincident with predetermined ones of said light conductor and electrical conductor crossings—whereby independent sets of said binary code related voltages will be derived from said system of electrical conductors as a function of the position of said light source in relation to said rows of crossings.

5. Light responsive decimal to binary data converter switch means comprising:

(a) a system of paralleled binary code related electrical conductors;

(b) an electrode with means for connecting a voltage thereto;

(c) photoconductor material interconnecting said system of conductors and said electrode;

(d) a system of paralleled decimally oriented light conductors, each having a predetermined index of refraction, for controlling the conduction of light to said photoconductor material from a decimally oriented light source, and a light conducting jacket having an index of refraction less than said predetermined index for controlling the reflection of light through said light conductors;

(e) said photoconductor material being adapted to extend binary code related voltages to said system of electrical conductors corresponding to the decimal position of said light source;

(f) said paralleled light conductors and said paralleled electrical conductors being supported respectively on adjacent planes and angularly displaced with respect to one another so as to define between them a plurality of rows and columns of light conductor and electrical conductor crossings; and (g) means for operatively connecting said system of electrical conductors to said electrode, through said photoconductor material, coincident with predetermined ones of said light conductor and electrical conductor crossings—whereby said binary code related voltages will be extended to said system of electrical conductors corresponding to the decimal position of said light source and the position of said light source relative to said rows of crossings.

6. Light responsive decimal to binary data converter switch means comprising:

(a) a system of paralleled binary code related electrical conductors;

(b) an electrode with means for connecting a voltage thereto;

(c) photoconductor material interconnecting said system of conductors and said electrode;

(d) a system of paralleled, decimally oriented, light conductor means for controlling the exposure of said photoconductor material to a decimally oriented light beam;

(e) said photoconductor material interconnecting said system of conductors and said electrode in a predetermined manner whereby binary code related voltages will be extended to said system of electrical conductors corresponding to a predetermined position of said decimally oriented light beam;

(f) said system of electrical conductors being angularly displaced with respect to said system of light conductor means and supported adjacent each other so as to define between said respective systems an array of rows and columns of light conductor and electrical conductor crossings;

(g) means for interconnecting said system of electrical conductors and said electrode by means of said photoconductor materail coincident with predetermined crossings of said array—whereby independent sets of said binary code related voltages will be extended to said system of electrical conductors upon the exposure of said light beam to predetermined rows of crossings and said photoconductor material adjacent said crossings.

7. Light responsive decimal to binary data converter switch means comprising:

(a) a longitudinally extending layer of photoconductor material having first and second ends;

(b) an electrode with means for connecting a voltage thereto;

(c) means for exposing said photoconductor material to a decimally positioned light beam;

(d) a plurality of paralleled, binary code related, electrical conductors;

(e) said conductors and said electrode being operatively connected to said photoconductor material intermediate said first and second ends, and adapted to extend binary code related voltages from said electrode to said conductors upon the exposure of said light beam to said photoconductor material;

(f) said last stated means including a system of paralleled first light conductor means, having a predetermined index of refraction, for supporting said layer of photoconductor material and conducting said light thereto, and a second light conductor means intimately joined to said first light conductor means, having an index of refraction less than said predetermined index, for controlling the reflection of said light through said first light conductor means and reflection of said light to said layer; and (g) said paralleled light conductor means and said paralleled electrical conductors being supported in relation to each other so as to provide between them a plurality of rows and columns of crossover points, and light responsive switch means adjacent each of said points for controlling said extension of voltages from said electrode to said electrical conductors.

References Cited by the Examiner

UNITED STATES PATENTS

| | | | |
|---|---|---|---|
| 2,843,773 | 7/58 | Wardley | 250—211 X |
| 2,897,399 | 7/59 | Garwin et al. | 250—211 X |
| 2,907,001 | 9/59 | Loebner | 250—213 |
| 2,911,539 | 11/59 | Tanenbaum | 250—211 X |
| 2,923,828 | 2/60 | Bernath | 250—211 X |
| 3,001,078 | 9/61 | Rulon | 250—211 X |
| 3,047,867 | 7/62 | McNaney | 250—227 |
| 3,056,031 | 9/62 | McNaney | 250—227 X |
| 3,059,115 | 10/62 | Lempicki | 250—211 X |
| 3,085,159 | 4/63 | McNaney | 250—227 X |
| 3,088,037 | 4/63 | Baum | 250—227 |
| 3,110,816 | 11/63 | Kaisler et al. | 250—211 X |

RALPH G. NILSON, *Primary Examiner.*

ARCHIE R. BORCHELT, *Examiner.*